United States Patent
Ohmori

(10) Patent No.: US 7,817,291 B2
(45) Date of Patent: Oct. 19, 2010

(54) IMAGE FORMING DEVICE AND HOST TERMINAL CONNECTED TO THE IMAGE FORMING DEVICE

(75) Inventor: Masatake Ohmori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 843 days.

(21) Appl. No.: 11/711,619

(22) Filed: Feb. 28, 2007

(65) Prior Publication Data

US 2007/0206218 A1 Sep. 6, 2007

(30) Foreign Application Priority Data

| Mar. 2, 2006 | (JP) | ............................ 2006-056405 |
| Feb. 6, 2007 | (JP) | ............................ 2007-027218 |

(51) Int. Cl.
*G06K 15/00* (2006.01)

(52) U.S. Cl. ..................... 358/1.14; 382/124; 340/5.53; 340/5.54

(58) Field of Classification Search ............... 358/1.14, 358/468; 382/115, 124, 305, 100; 340/5.1, 340/5.2, 5.3, 5.31, 5.32, 5.5, 5.51, 5.52, 5.53, 340/5.54, 5.8, 5.81, 5.82, 5.83, 5.84, 5.85; 399/366; 726/2–6

See application file for complete search history.

(56) References Cited

U.S. PATENT DOCUMENTS

| 7,136,176 B2 * | 11/2006 | Sugiyama .................. 358/1.14 |
| 7,180,626 B1 * | 2/2007 | Gassho et al. ................ 358/1.6 |
| 2005/0259290 A1 * | 11/2005 | Tijerino et al. ............. 358/1.14 |
| 2006/0092453 A1 * | 5/2006 | Okada et al. ............... 358/1.14 |
| 2006/0285148 A1 * | 12/2006 | Matsushima et al. ....... 358/1.14 |
| 2007/0013938 A1 * | 1/2007 | Itagaki ...................... 358/1.14 |
| 2007/0124800 A1 * | 5/2007 | Kadota .......................... 726/2 |
| 2007/0127053 A1 * | 6/2007 | Tominaga .................. 358/1.14 |
| 2007/0253013 A1 * | 11/2007 | Shudo ........................ 358/1.14 |
| 2007/0268512 A1 * | 11/2007 | Sakakibara ................ 358/1.14 |

FOREIGN PATENT DOCUMENTS

| JP | 2001-051811 | 2/2001 |
| JP | 2003-177880 | 6/2003 |
| JP | 2003-244367 | 8/2003 |
| JP | 2004-338295 | 12/2004 |

* cited by examiner

*Primary Examiner*—Jon Chang
(74) *Attorney, Agent, or Firm*—Harness, Dickey & Pierce, P.L.C.

(57) ABSTRACT

In an image forming device, an identification data input unit receives a first user-identification data which identifies a user of the image forming device and is inputted by the user. A data comparison unit detects whether the first user-identification data matches with a second user-identification data received from a host terminal before or after an image output request is received or concurrently with receipt of the image output request. A management information transmitting unit transmits an image output enabled state notice to the host terminal in response to the image output request when the first user-identification data matches with the second user-identification data. An image output unit receives image data transmitted by the host terminal in response to the image output enabled state notice, and outputs an image based on the received image data.

10 Claims, 9 Drawing Sheets

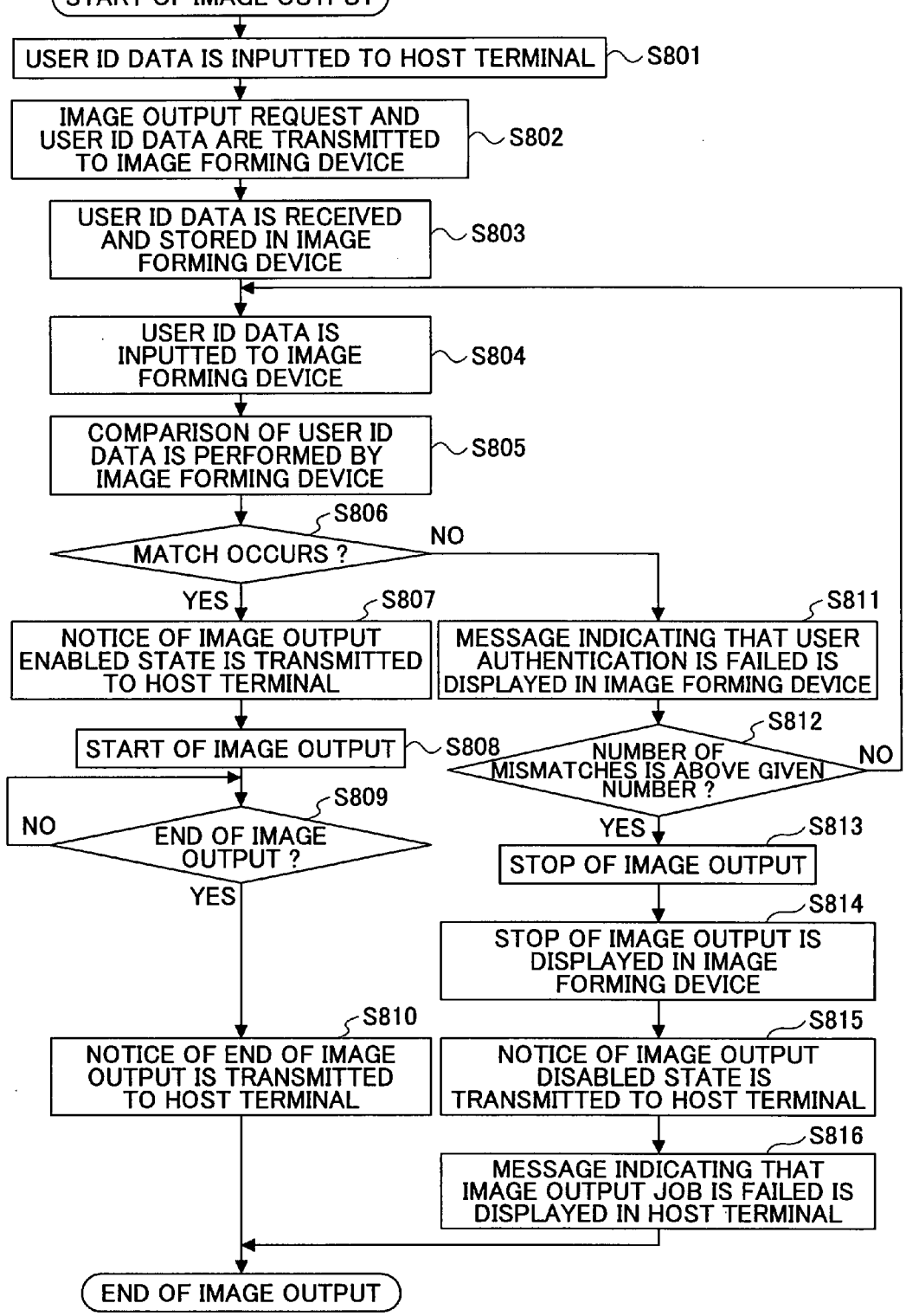

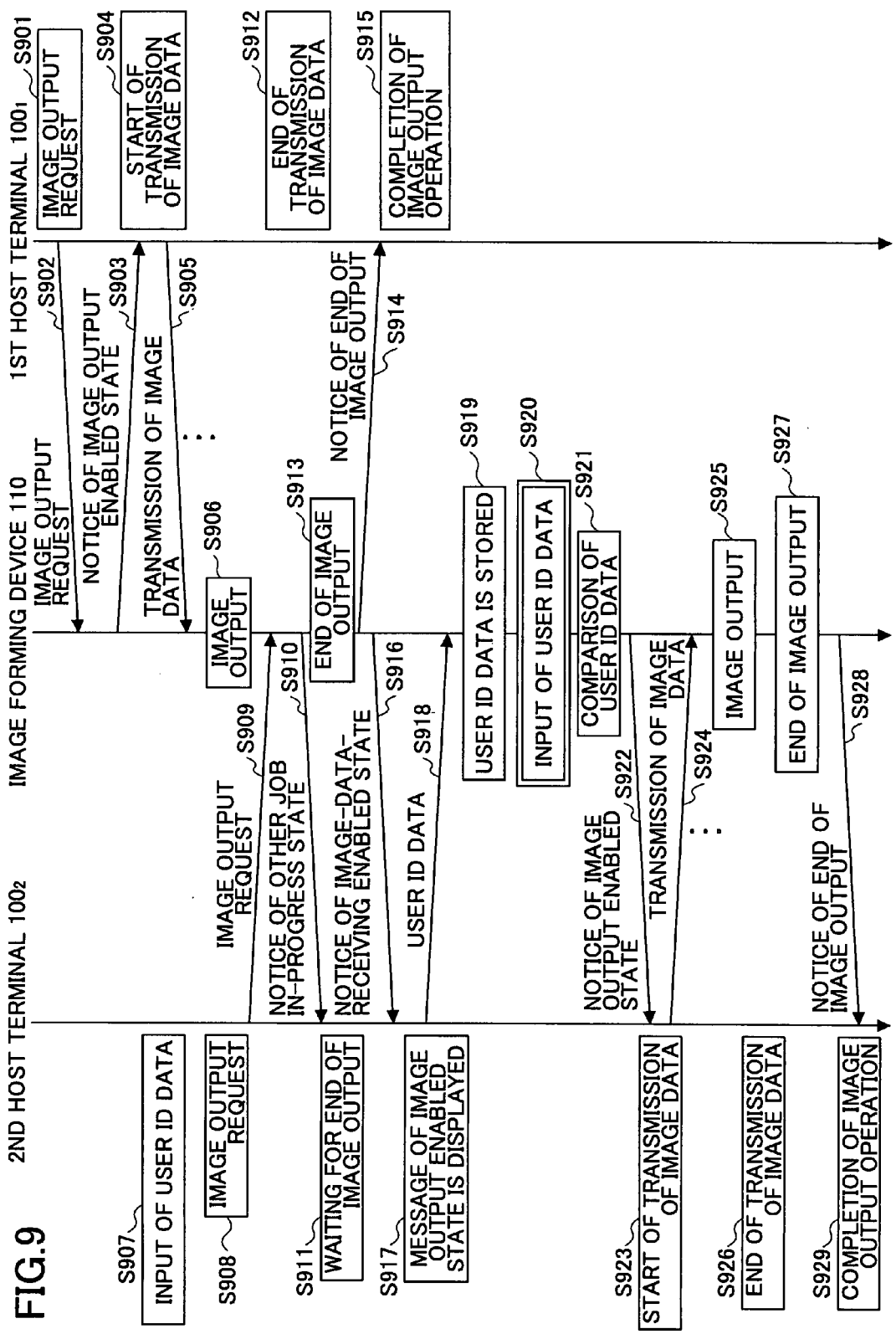

IMAGE FORMING DEVICE AND HOST TERMINAL CONNECTED TO THE IMAGE FORMING DEVICE

BACKGROUND OF THE INVENTION

1. Field of the Invention

This invention generally relates to an image forming device and a host terminal connected to the image forming device. More particularly, this invention relates to an image forming device which performs an image output process based on an image output request from a specific user when one or a plurality of host terminals are connected to the image forming device.

2. Description of the Related Art

In a recent office environment, an image forming device which is shared by a plurality of users is connected to a network. If the users try to output image data by using the image forming device simultaneously, after a printing job of a first user is completed, a printing job of a second user is subsequently performed. In order to carry out this operation without delay, the image forming device has to receive the second user's print data during the first user's printing job. For this purpose, the image forming device requires a memory unit which holds the second user's print data at this time.

In addition, in the case of the above-mentioned the image forming device, the respective printed results of the first user and the second user are outputted using the same device, and there is a problem that one user is able to easily see the printed result of another user. If the printed result contains confidential data, the leakage of the confidential data to an outsider tends to arise in this case.

To obviate the problem, an image forming device having a confidential output function has been proposed. When this confidential output function is used, each user is requested, prior to starting image output operation, to input an identification data, such as a password, which is set up at the time of printing, and only a document image the printing of which is requested by the user together with the identification data is outputted by the image forming device.

FIG. 1 shows an example of the printing procedure performed by the image forming device having the confidential output function.

Upon start of the procedure of FIG. 1, in step S101, the user inputs the user-identification (ID) data for identifying the user, to a host terminal 1 (which is a personal computer (PC)).

In step S102, the host terminal 1 transmits a printing request for execution of a print job to an image forming device 2 together with the user-identification data, or separately from the transmission of the user-identification data to the image forming device 2.

In step S103, the image forming device 2 stores the user-identification data received from the host terminal 1, into a memory unit provided in the image forming device 2.

When the image forming device 2 at this time is in a print enabled state, the image forming device 2 transmits a notice of print enabled state to the host terminal 1.

After the notice of print enabled state is received from the image forming device 2, the host terminal 1 starts transmission of print data to the image forming device 2 in step S104.

After the transmission of print data is completed in step S105, the host terminal 1 is in a waiting state in which receiving of a printed result from the image forming device 2 is awaited.

In step S106, the image forming device 2 stores the print data received from the host terminal 1, into the memory unit.

Subsequently, in step S107, the user inputs the user-identification data for identifying the user, to the image forming device 2 through the operation panel.

In step S108, the user-identification data received from the host terminal 1 and stored in step S103 is compared with the user-identification data inputted in step S107.

When a match of these user-identification data occurs as a result of comparison, the image forming device 2 starts printing of the print data stored in the memory unit in step S109.

After printing is completed in step S100, the image forming device 2 transmits a notice of end of printing to the host terminal 1.

Finally, in step S111, the host terminal 1 finishes the printing operation in response to the notice of end of printing received from the image forming device 2.

Thus, using the confidential output function of the conventional image forming device makes it possible to eliminate the above problem that the printed result may be seen by another user other than the user who has performed the printing request.

However, as is apparent from the above-described printing procedure, it is necessary that the conventional image forming device having the confidential output function continuously holds the received print data until an image output is requested by the user with the input of the user-identification data. Thus, there is a problem that the conventional image forming device must have a mass storage device, in order to allow a large number of users who share the image forming device to utilize the image forming device.

To obviate the above problem, Japanese Laid-Open Patent Application No. 2001-051811 discloses a printing device having an improved function. This printing device is provided with a memory device, and the print data received from a PC client (host terminal) are stored in the memory device. Thereafter, printing operation is performed by the printing device in response to a printing request received from the user. In order to use efficiently the printing device which is shared by a large number of users, the printing device is provided so that the unused areas of the memory device may be expanded by lowering the resolution of image data stored in the memory device.

However, even if the unused areas of the memory device (e.g., a HDD) provided in the image forming device (disclosed in Japanese Laid-Open Patent Application No. 2001-051811) can be expanded by lowering the resolution of image data stored in the memory device, the memory device has a limited storage capacity. When the number of host terminals connected to the image forming device is further increased, or when the number of users who share the image forming device is further increased, there is a restriction as to the expansion of the unused areas of the memory device. And there is a problem that the necessity of large storage capacity of the memory device cannot be eliminated. Moreover, the manufacturing cost of the image forming device will be increased in association with an increase of the storage capacity of the memory device.

SUMMARY OF THE INVENTION

According to one aspect of the invention, there is provided an improved image forming device and host terminal in which the above-described problems are eliminated.

According to one aspect of the invention there is provided an image forming device which minimizes a storage capacity of a memory device for holding image data and realizes a confidential output function to allow an image output operation to be performed by a specific user.

In an embodiment of the invention which solves or reduces one or more of the above-mentioned problems, there is provided an image forming device to which one or a plurality of host terminals are connected, the image forming device comprising: an identification data input unit receiving a first user-identification data which identifies a user of the image forming device and is inputted by the user; a data comparison unit detecting whether the first user-identification data received by the identification data input unit matches with a second user-identification data which is received from a host terminal before or after an image output request is received from the host terminal or concurrently with receiving of the image output request; a management information transmitting unit transmitting an image output enabled state notice to the host terminal in response to the image output request when it is detected by the data comparison unit that the first user-identification data matches with the second user-identification data; and an image output unit receiving image data which is transmitted by the host terminal in response to the image output enabled state notice from the management information transmitting unit, and outputting an image based on the received image data.

In an embodiment of the invention which solves or reduces one or more of the above-mentioned problems, there is provided a host terminal which is connected to an image forming device and generates image data being transmitted to the image forming device, the image forming device comprising: an identification data input unit receiving a first user-identification data which identifies a user of the image forming device and is inputted by the user; a data comparison unit detecting whether the first user-identification data matches with a user-identification data which is received before or after an image output request is received or concurrently with receipt of the image output request; a management information transmitting unit transmitting an image output enabled state notice to the host terminal in response to the image output request when it is detected by the data comparison unit that the first user-identification data matches with the received user-identification data; and an image output unit receiving image data which is transmitted by the host terminal in response to the image output enabled state notice from the management information transmitting unit, and outputting an image based on the received image data, the host terminal comprising: an image output request input unit receiving a second user-identification data which identifies a user who transmits the image output request of the image data and is inputted by the user; an image output request transmitting unit transmitting the second user-identification data received by the image output request input unit, to the image forming device before or after the image output request is transmitted to the image forming device or concurrently with the transmission of the image output request; and an image-data transmitting unit transmitting the image data to the image forming device when the image output enabled state notice is received from the image forming device.

According to embodiments of the image forming device and the host terminal of the invention, after the user authentication is completed on the image forming device, the image data which are objects of image output are transmitted from the host terminal to the image forming device. The storage capacity of a memory device for holding image data in the image forming device can be minimized, and it is possible to provide an image forming device and a host terminal which can realize a confidential output function to allow an image output operation to be performed by a specific user.

BRIEF DESCRIPTION OF THE DRAWINGS

Other objects, features and advantages of the present invention will be apparent from the following detailed description when reading in conjunction with the accompanying drawings.

FIG. 8 is a flowchart for explaining the image output procedure performed by the image forming device and the host terminal in an embodiment of the invention.

FIG. 9 is a diagram for explaining the image output procedure performed by the image forming device and the host terminal in an embodiment of the invention.

DETAILED DESCRIPTION OF PREFERRED EMBODIMENTS

A description will be given of embodiments of the invention with reference to the accompanying drawings.

Figure 1:
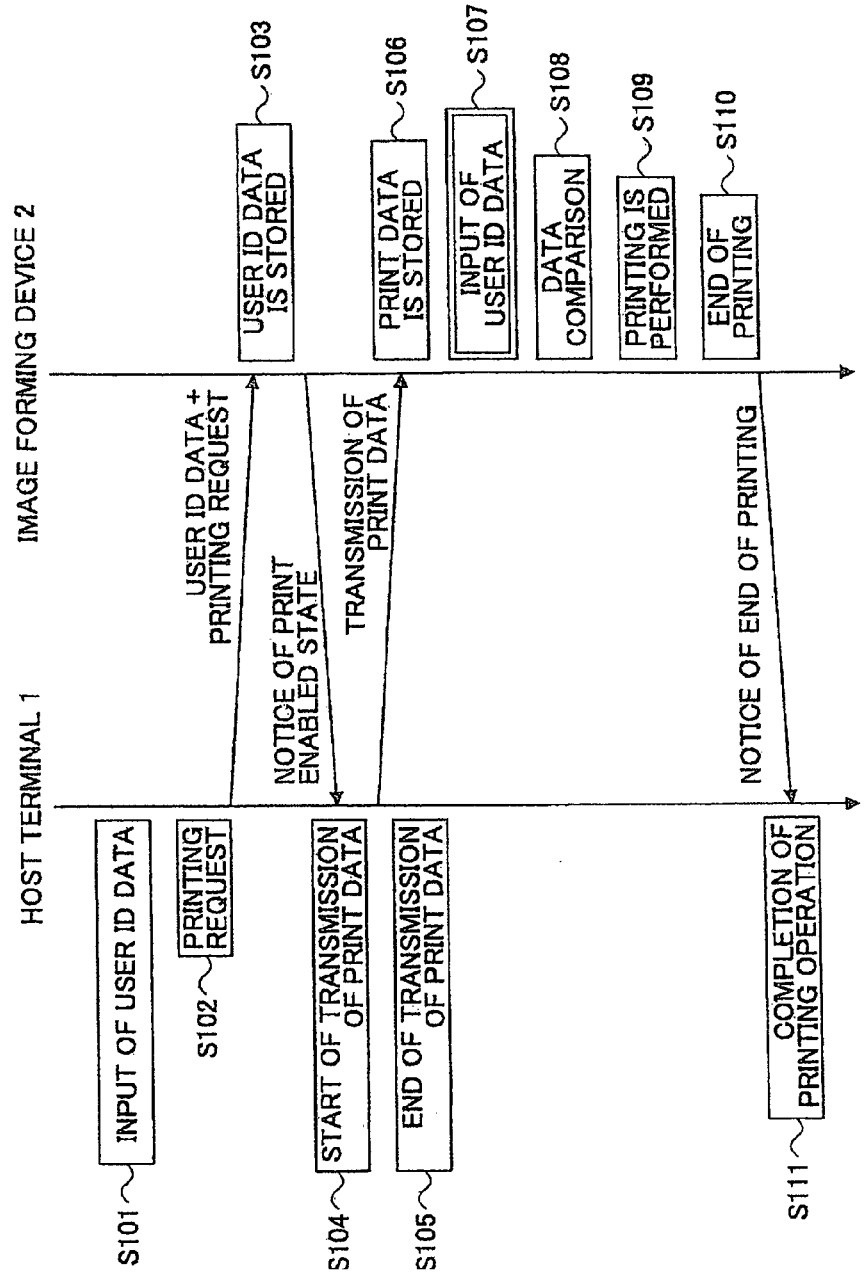
FIG. 1 is a diagram for explaining an example of the printing procedure performed by a conventional image forming device which has a confidential output function.
Figure 2:
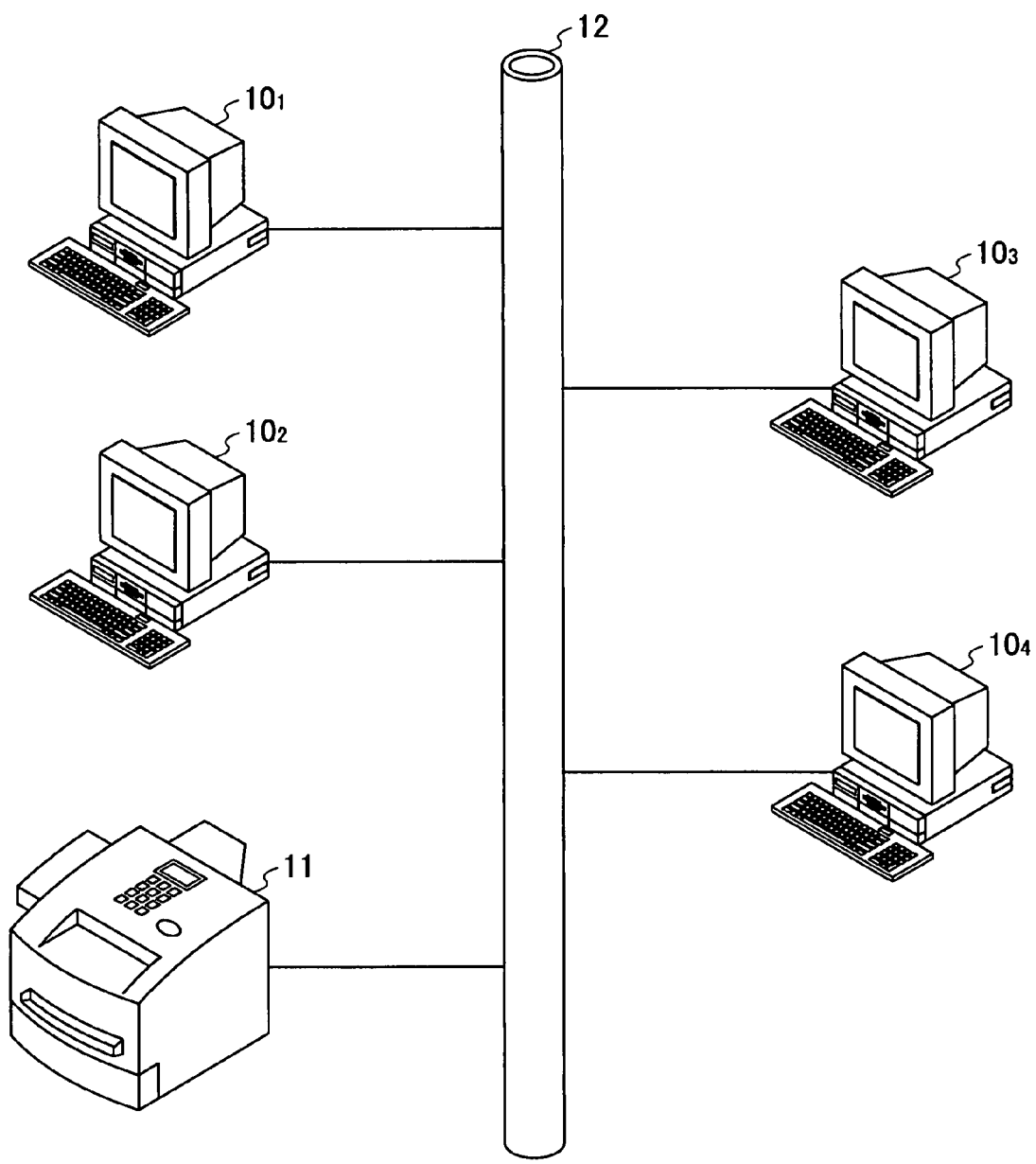
FIG. 2 is a diagram showing an example of network connection of an image forming device and a plurality of host terminals in an embodiment of the invention.

FIG. 2 shows an example of network connection of an image forming device and a plurality of host terminals in an embodiment of the invention. In FIG. 2, a plurality of host terminals $10_1$, $10_2$, $10_3$, and $10_4$, such as personal computers (PC), are connected through a network 12, to an image forming device 11. This image forming device 11 is shared by and in a state available to a plurality of users on the respective host terminals.

The data communication between each of the host terminals $10_1$, $10_2$, $10_3$, $10_4$ and the image forming device 11 is performed through the network 12. In this embodiment, a local area network (LAN) is used as the network 12. However, this invention is not limited to this embodiment. Any kind of network which interconnects a plurality of devices and realizes data communication between the devices may be used as the network 12.

Figure 3:
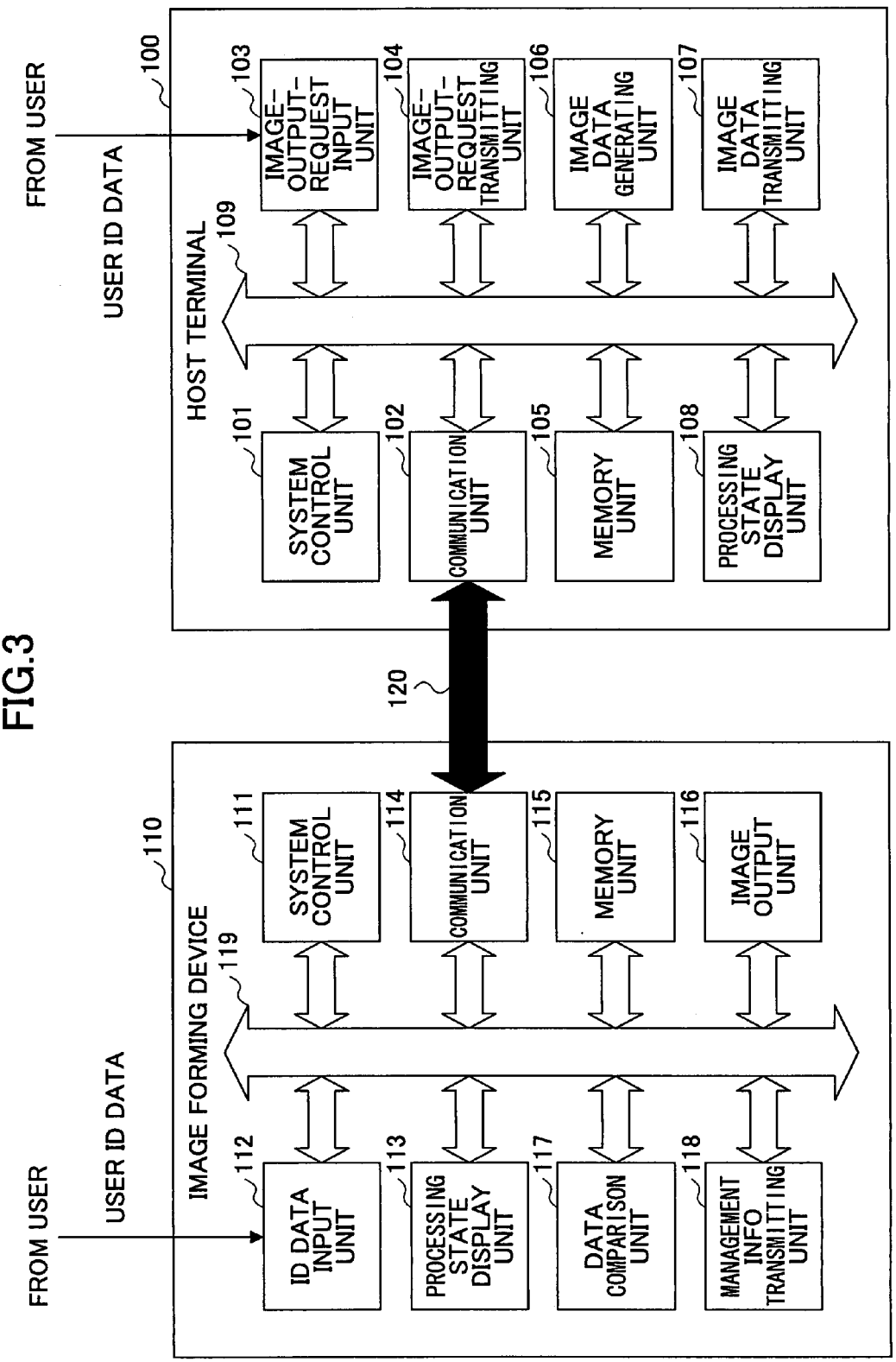
FIG. 3 is a block diagram showing the composition of the image forming device and the host terminal in an embodiment of the invention.

FIG. 3 shows the composition of an image forming device and a host terminal in an embodiment of the invention. The host terminal 100 and the image forming device 110 are connected together by a LAN 120.

The host terminal 100 includes a system control unit 101, a communication unit 102, an image output request input unit 103, an image output request transmitting unit 104, a memory unit 105, an image-data generating unit 106, an image-data transmitting unit 107, a processing state display unit 108, and a bus 109.

The system control unit 101 is a control unit which controls the whole host terminal 100, and this system control unit 101 includes a central processing unit (CPU), a read-only memory (ROM), a random access memory (RAM), etc.

The communication unit 102 performs transmission and reception of data between the host terminal 100 and an external device, and this communication unit 102 is connected through the LAN 120 to the image forming device 110.

The image output request input unit 103 is an input unit which receives an image output request requesting the image forming device 110 to perform an image output operation and being inputted by the user, and receives a user-identification data identifying the user who requests performance of an image output operation by the image forming device 110 and being inputted by the user. The image output request input unit 103 may be provided in a user interface unit, such as a mouse or a keyboard, for allowing the user to perform operation and data input to the host terminal 100.

The user-identification data may be the information to identify the individual user, such as a four-digit password or fingerprint authentication. Alternatively, the user-identification data may be in any kind of form.

The image output request transmitting unit 104 is a transmitting unit which transmits the image output request and the user-identification data, received by the image output request input unit 103, to the image forming device 110 independently or simultaneously.

The memory unit 105 is a memory device which stores drawing image data generated by an application program (not shown) provided in the host terminal 100, and this memory unit 105 may be a semiconductor memory, a hard disk drive (HDD), or an optical disk drive.

The image-data generating unit 106 is a data generating unit which generates image data that can be interpreted by the image forming device 110, based on the drawing image data stored in the memory unit 105. The image data generated are described in a predetermined printer language, such as PDL (page description language), for example.

The image-data transmitting unit 107 may be a transmitting unit which transmits the image data generated by the image-data generating unit 106, to the image forming device 110. This image-data transmitting unit 107 may be a data transmission module, such as a spooler, for example.

The processing state display unit 108 is a display unit which notifies a processing state and an operating state of the image forming device 110 to the user. This processing state display unit 108 may be a display device, such as a liquid crystal display (LCD) or a cathode-ray tube (CRT), for example. However, it is not limited to these display devices.

The bus 109 is a path through which image data or control information are transmitted between the respective elements of the host terminal 100.

The image forming device 110 includes a system control unit 111, an identification data input unit 112, a processing state display unit 113, a communication unit 114, a memory unit 115, an image output unit 116, a data comparison unit 117, a management information transmitting unit 118, and a bus 119.

The system control unit 111 is a control unit which controls the whole image forming device 110, and the system control unit 111 includes a central processing unit (CPU), a read-only memory (ROM), a random access memory (RAM), etc.

The identification data input unit 112 is an input unit which receives a user-identification data that identifies the user who uses the image forming device 110 and is inputted by the user. The processing state display unit 113 is a display unit which notifies the processing state or condition of the image forming device 110 to the user.

Both the unit 112 and the unit 113 may be provided in a user interface part, such as an operation panel, which is provided in the image forming device 110 to perform operation and setup of the image forming device 110.

The processing state display unit 113 may be either a hearing indicator unit, such as a loudspeaker, or a visual indicator unit, such as a liquid crystal display (LCD) or a light emitting diode (LED), or those in combination. Alternatively, the processing state display unit 113 may be in any kind of form if it is capable of notifying information to the user.

The communication unit 114 performs transmission and reception of data between the image forming device 110 and an external device, and this communication unit 114 is connected through the LAN 120 to the host terminal 100.

The memory unit 115 is a memory device which temporarily stores the user-identification data and the image data which are the objects of image output received from the host terminal 100, and temporarily stores the user-identification data inputted to the image forming device 110 and received by the identification data input unit 112. The memory unit 115 may be, for example, a semiconductor memory, a hard disk drive (HDD), or an optical disk drive.

The image output unit 116 is an output device which outputs an image based on the received image data which are the objects of image output, by printing the image on a recording sheet or transmitting the image data to an external unit via the network 120.

The data comparison unit 117 is a detecting unit which detects whether the user-identification data inputted to the image forming device 110 and received by the identification data input unit 112 matches with the user-identification data received from the host terminal 100, through the data comparison.

The management information transmitting unit 118 is a transmitting unit which transmits a notice which indicates whether execution of an image output operation in the image forming device 110 is possible, to the host terminal 100 according to the result of the data comparison by the data comparison unit 117, or according to the state of the image forming device 110.

The bus 119 is a path through which image data or control information are transmitted between the respective elements of the image forming device 110.

In the following, some examples of image output procedure performed by the image forming device and the host terminal shown in FIG. 3 will be explained.

Figure 4:
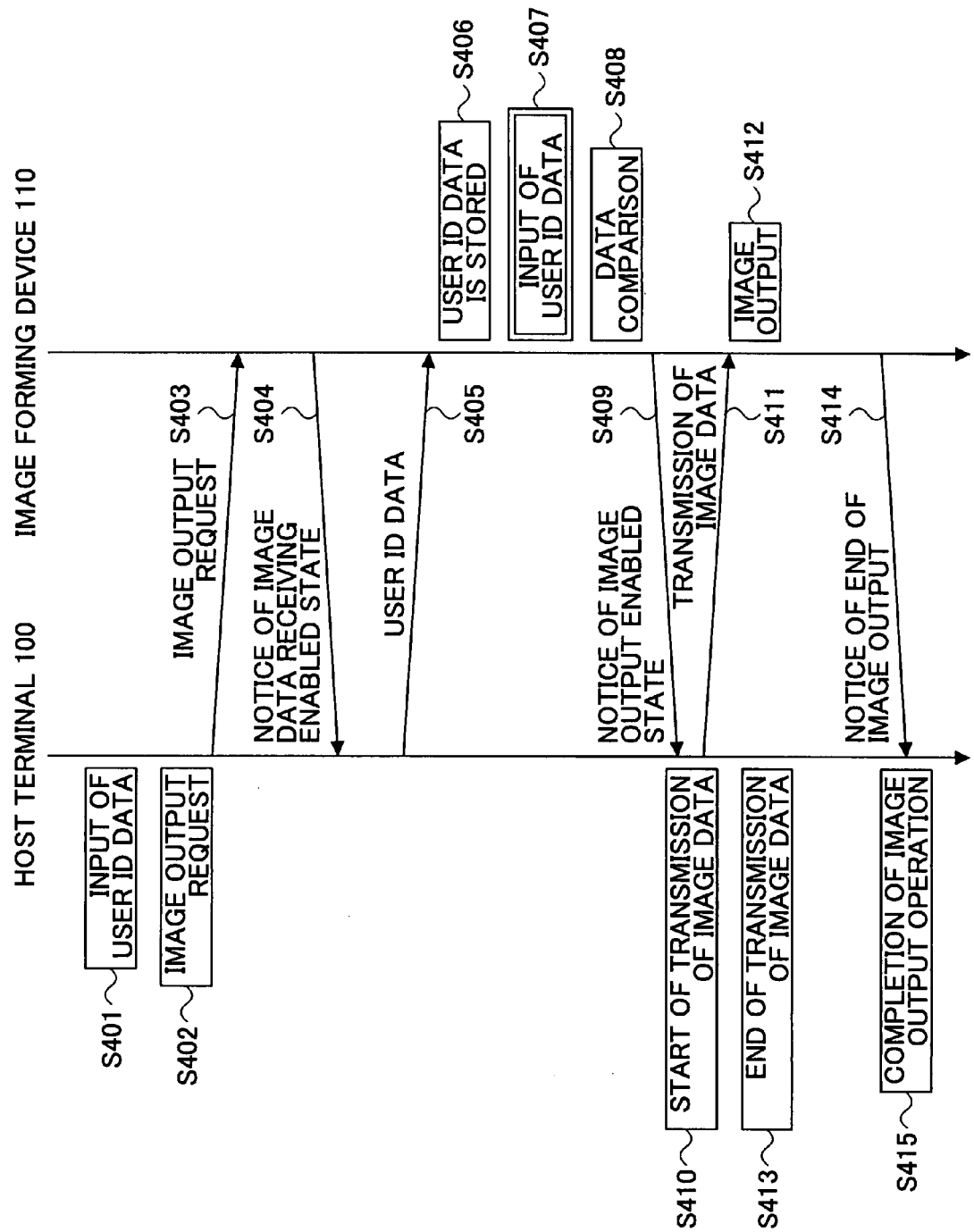
FIG. 4 is a diagram for explaining the image output procedure performed by the image forming device and the host terminal in an embodiment of the invention.

FIG. 4 is a diagram for explaining the image output procedure performed by the image forming device and the host terminal in an embodiment of the invention.

Upon start of the procedure of FIG. 4, in step S401, the user inputs a user-identification data for identifying the user to the host terminal 100 by using the image output request input unit 103.

Next, in step S402, the user inputs an image output request for requesting execution of an image output job by the image forming device 110 by using the image output request input unit 103.

In this embodiment, the image output request inputted by the user is to request execution of an image output job according to the confidential output function in which execution of the image output job is not permitted for another person other than a specific user of the image forming device 110.

After the image output request is inputted by the user, the host terminal 100 in step S403 transmits this image output request to the image forming device 110 through the communication unit 102 by using the image output request transmitting unit 104.

For example, even when the image forming device 110 at this time is in a sleep mode, the image forming device 110 returns from the sleep mode and is is set in a normal mode if the image output request from the host terminal 100 is received at the image forming device 110.

In step S404, the image forming device 110 transmits a notice of image-data-receiving enabled state to the host terminal 100, when any image output job is not in progress and the image forming device 110 is currently in a state that can receive the image data as objects of image output.

In response to this notice, the host terminal 100 in step S405 transmits the user-identification data previously inputted by the user, from the image output request transmitting unit 104 to the image forming device 110 through the communication unit 102.

Alternatively, when a user-identification data is transmitted to the image forming device prior to or concurrently with transmission of an image output request, the transmission of the user-identification data from the host terminal to the image forming device according to this invention may be performed prior to or concurrently with the transmission of the image output request.

Alternatively, when an image output request is transmitted separately from transmission of a user-identification data, the input of the user-identification data to the host terminal and the transmission of the user-identification data to the image forming device according to this invention may be performed by arbitrary timing prior to the inputting of the user-identification data to the image forming device by the user using the identification data input unit.

In step S406, the image forming device 110 receives the user-identification data, which has been transmitted through the network 120 by the host terminal 100, by using the communication unit 114, and stores the received user-identification data into the memory unit 115.

Subsequently, in step S407, the user inputs a user-identification data for identifying the user to the image forming device 110 by using the identification data input unit 112, in order to request performance of an image output operation to the image forming device 110.

After the user-identification data is inputted by the user, the image forming device 110 in step S408 controls the data comparison unit 117 so that the data comparison unit 117 compares the inputted user-identification data with the user-identification data which is previously received from the host terminal 100 at the image forming device 110 and previously stored in the memory unit 115.

As a result, when matching of those user-identification data occurs, the image forming device 110 transmits in step S409 an image output enabled state notice, indicating that the image forming device 110 is in an image output enabled state, to the host terminal 100 through the communication unit 114 by using the management information transmitting unit 118.

Alternatively, the image output enabled state notice may be provided to only indicate that matching of the user-identification data occurs.

In response to the image output enabled state notice, the host terminal 100 in step S410 starts transmission of the image data from the host terminal 100 to the image forming device 110 by using the image-data transmitting unit 107.

The image data are transmitted from the host terminal 100 through the communication unit 102 to the image forming device 110 in step S411.

The image forming device 110 in step S412 receives the image data from the host terminal 100 through the communication unit 114. The host terminal 100 in step S413 finishes the transmission of the image data. During the period from the start of transmission to the end of transmission of the image data, the image output unit 116 of the image forming device 110 continuously performs the outputting of an image in real time based on the received image data as the objects of image output (for example, printing of an image on a recording sheet, displaying of an image on display device, such as a display monitor, or transmitting of image data to another external device).

After execution of the image output operation is completed, the image forming device 110 in step S414 transmits an image output end notice, which indicates the end of execution of the image output operation, to the host terminal 100 through the communication unit 114 by using the management information transmitting unit 118.

Finally, the host terminal 100 in step S415 finishes the image output operation in response to the image output end notice which is received through the communication unit 102 from the image forming device 110.

The image output procedure performed by the image forming device and the host terminal of this embodiment will be explained in greater detail with reference to FIG. 5.

Figure 5:
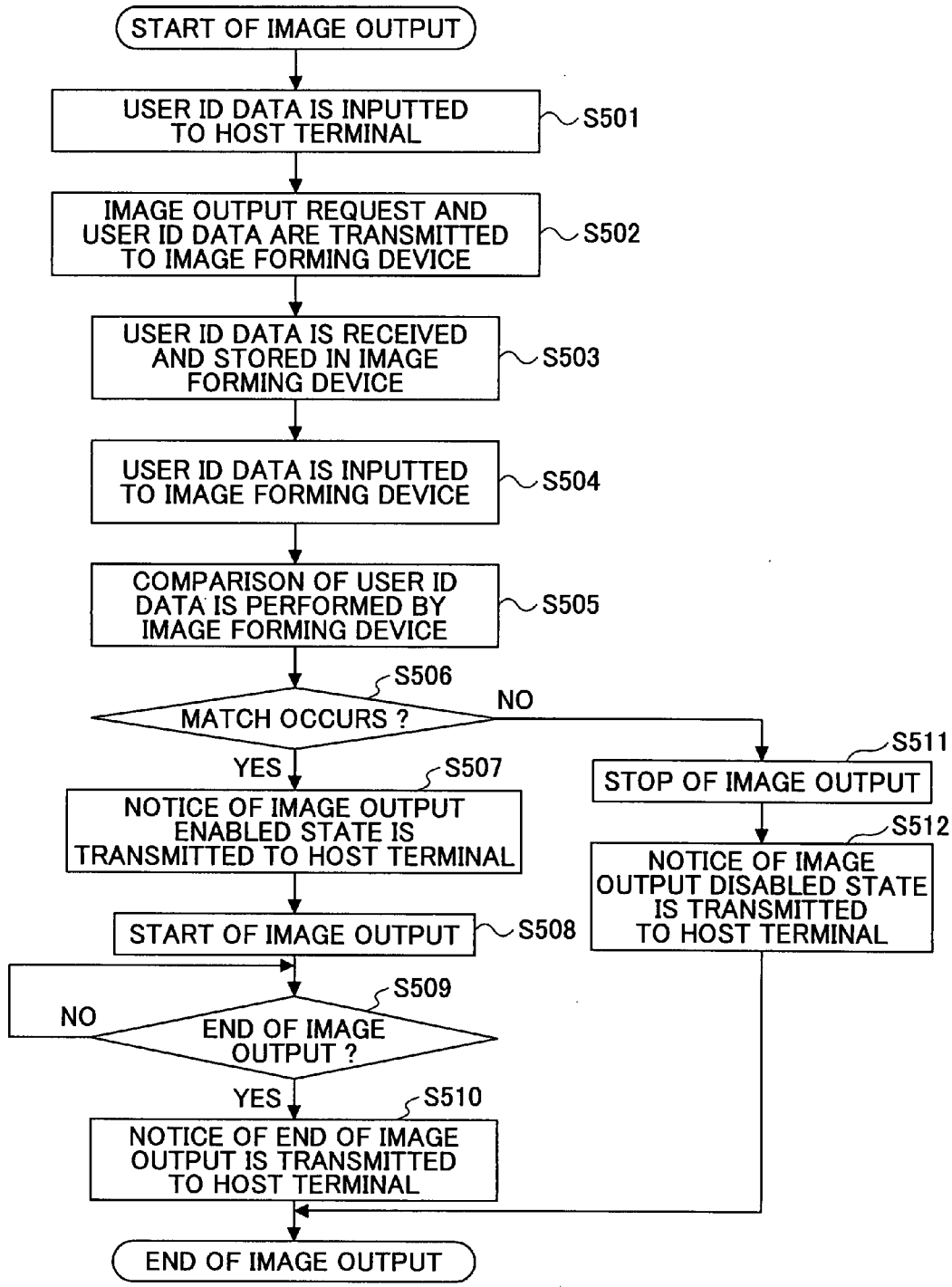
FIG. 5 is a flowchart for explaining the image output procedure performed by the image forming device and the host terminal in an embodiment of the invention.

FIG. 5 is a flowchart for explaining the image output procedure performed by the image forming device and the host terminal in the embodiment shown in FIG. 4.

Upon start of the image output procedure of FIG. 5, in step S501, the user inputs a user-identification data for identifying the user to the host terminal 100 by using the image output request input unit 103.

Next, the host terminal 100 in step S502 transmits, before or after an image output request for execution of an image output job is transmitted to the image forming device 110 or simultaneously with transmission of the image output request, the user-identification data received by the image output request input unit 103, to the image forming device 110 through the communication unit 102 by using the image output request transmitting unit 104.

After the image output request is transmitted, the host terminal 100 is in a waiting state in which transmission of image data to the image forming device 110 is awaited.

In step S503, the image forming device 110 receives the user-identification data, which is transmitted through the network 120 by the host terminal 100, through the communication unit 114, and stores the received user-identification data in the memory unit 115.

Subsequently, in step S504, the user inputs the user-identification data for identifying the user to the image forming device 110 by using the identification data input unit 112, in order to request performance of an image output operation to the image forming device 110.

After the user-identification data is inputted by the user, the image forming device 110 in step S505 controls the data comparison unit 117 so that the data comparison unit 117 compares the inputted user-identification data with the user-identification data which is previously received from the host terminal and previously stored in the memory unit 115. The data comparison unit 117 in step S506 detects whether matching of those user-identification data occurs or not.

When the matching of the user-identification data occurs (or when the user who has transmitted the image output request from the host terminal to the image forming device and the user who has inputted the image output request to the image forming device using the identification data input unit are detected to be the same person), the control is shifted from step S506 to step S507.

The image forming device 110 in step S507 transmits an image output enabled state notice, indicating that the image forming device 110 is in an image output enabled state, to the host terminal 100 through the communication unit 114 by using the management information transmitting unit 118.

In response to the image output enabled state notice, the host terminal 100 in step S508 transmits the image data (which are objects of image output operation) through the communication unit 102 to the image forming device 110 by using the image-data transmitting unit 107. The image forming device 110 receives the image data from the host terminal 100 through the communication unit 114, so that the image output unit 116 continuously performs outputting of an image in real time based on the received image data as the objects of image output operation until the host terminal 100 finishes the transmission of image data to the image forming device 110.

After execution of the image output operation by the image forming device 110 is completed in step S509, the image forming device 110 in step S510 transmits an image output end notice, which indicates the end of execution of the image output operation, to the host terminal 100 through the communication unit 114 by using the management information transmitting unit 118.

Finally, the host terminal 100 finishes the image output operation in response to the image output end notice received from the image forming device 110 through the communication unit 102.

On the other hand, when the matching of the user-identification data does not occur (or when the user who has transmitted the image output request from the host terminal to the image forming device and the user who has inputted the image output request to the image forming device using the identification data input unit are detected to be different persons), the control is shifted from step S506 to step S511.

In step S511, the image forming device 110 stops performance of the image output job. The image forming device 110 in step S512 transmits an image output disabled state notice, indicating that the image forming device 110 is in an image output disabled state, to the host terminal 100 (which has transmitted the image output request through the communication unit 114), by using the management information transmitting unit 118.

Since the host terminal 100 is still in an image-data transmission waiting state after the image output request is transmitted to the image forming device 110, the host terminal 100 is able to cancel the image-data transmission waiting state in response to the image output disabled state notice received from the image forming device 110 through the communication unit 102.

Alternatively, when the matching of the user-identification data does not occur, the performance of the image output job by the image forming device 110 may be stopped by the host terminal 100 which has received the image output disabled state notice from the image forming device 110, not by the image forming device 110.

As mentioned above, the image forming device of this embodiment differs from the conventional image forming device in that the user authentication using the user-identification data is carried out before the image data (which are objects of image output operation) are received from the host terminal. The image forming device of this embodiment can perform in real time the outputting of an image based on the image data received from the host terminal, and it is no longer necessary to have a mass storage device for holding the image data until the user authentication is completed as in the conventional image forming device.

If the conventional image forming device is a memory-full state when an image output request is received from the host terminal, the memory device of the conventional device is unable to receive any image data from the host terminal. However, in the case of the image forming device of this embodiment, the image data are received from the host terminal after the user authentication using the user-identification data is performed, the problem of the conventional device mentioned above can be eliminated.

In the above embodiment, the image forming device 110 stops performance of the image output job when the user-identification data received from the host terminal 100 and the user-identification data inputted to the image forming device 110 are not in agreement.

Alternatively, in such a case, information concerning the mismatch of the user-identification data may be notified to the user. An image output procedure of the image forming device in another embodiment of the invention in which the user can be notified of the mismatch of the user-identification data will be explained with reference to FIG. 3 and FIG. 6

Figure 6:
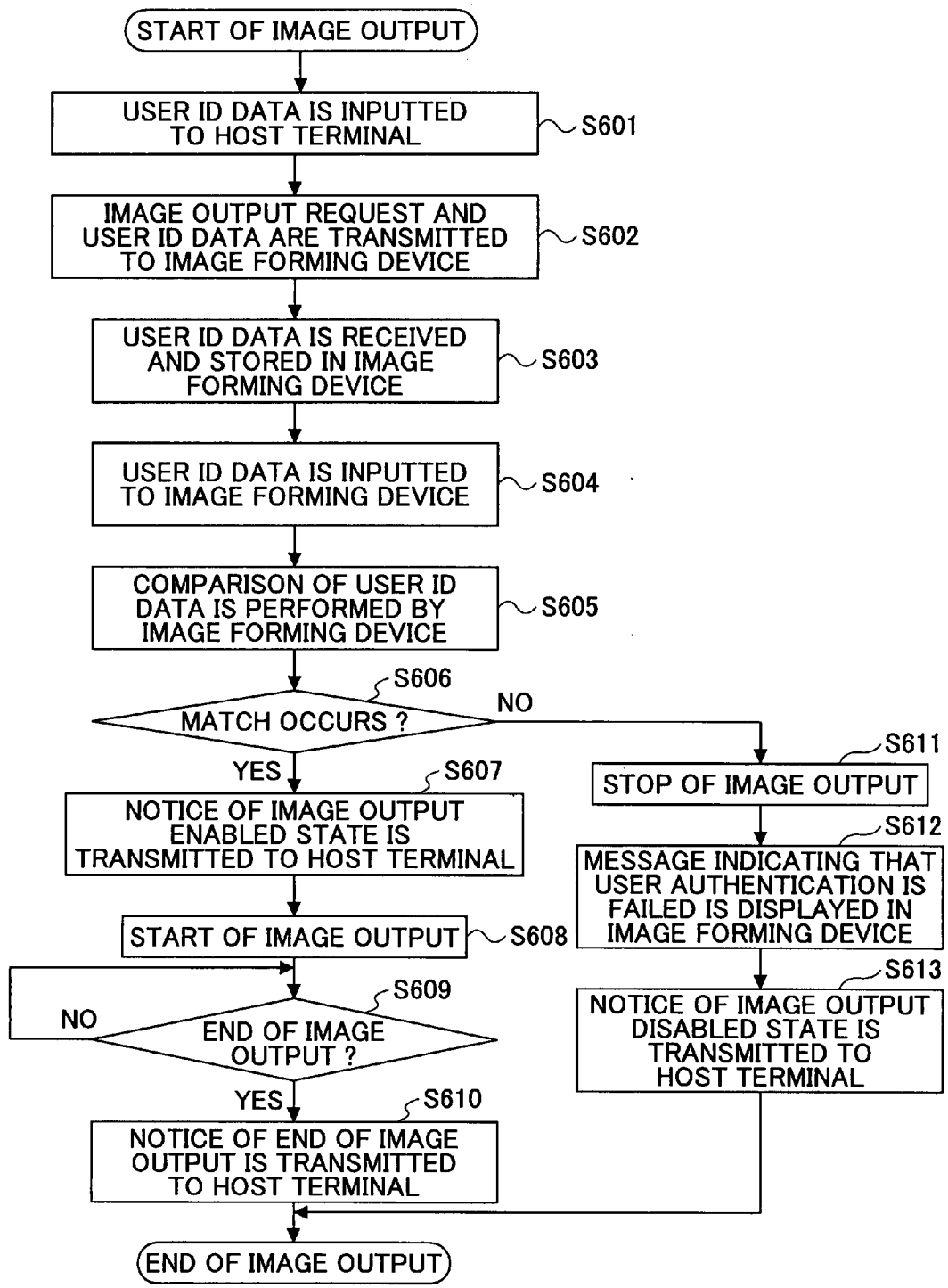
FIG. 6 is a flowchart for explaining the image output procedure performed by the image forming device and the host terminal in an embodiment of the invention.

FIG. 6 is a flowchart for explaining the image output procedure performed by the image forming device and the host terminal in this embodiment.

The procedure of steps S601-S610 in FIG. 6 from the start of the image output to the end of the image output when the matching of the user-identification data occurs is essentially the same as the procedure of corresponding steps S501-S510 in FIG. 5, and a description thereof will be omitted.

On the other hand, when the matching of the user-identification data does not occurs, the embodiment of FIG. 6 differs from the previous embodiment of FIG. 5 in that this embodiment includes a step which notifies the user of the mismatch of the user-identification data by using the processing state display unit 113 of the image forming device 110.

Specifically, in the procedure of FIG. 6, when it is detected in step S606 that the matching of the user-identification data does not occur, the image forming device 110 in step S611 stops performance of the image output job.

Next, the image forming device 110 in step S612 displays a message indicating that the user authentication is failed, by using the processing state display unit 113. The image forming device 110 in step S613 transmits an image output disabled state notice, which indicates that the image forming device is in an image output disabled state, to the host terminal 100 (which has transmitted the image output request) through the communication unit 114 by using the management information transmitting unit 118.

Since the host terminal 100 is still in an image-data transmission waiting state after the image output request is transmitted to the image forming device 110, the host terminal 100 is able to cancel the image-data transmission waiting state in response to the image output disabled state notice received from the image forming device 110 through the communication unit 102.

As mentioned above, the image forming device of this embodiment specifies, to the user who requests performance of an image output operation to the image forming device, the message indicating that the user authentication is failed, and it is possible for the image forming device of this embodiment to request the user to perform reinputting of user-identification data or re-execution of image output operation.

Alternatively, when the user-identification data transmitted to the image forming device 110 from the host terminal 100 and the user-identification data inputted to the image forming device 110 are not in agreement, reinputting of user-identification data may be permitted for the user on the image forming device 110. An image output procedure of the image forming device in another embodiment of the invention in which the user is permitted to perform reentry of user-identification data will be explained with reference to FIG. 3 and FIG. 7.

Figure 7:
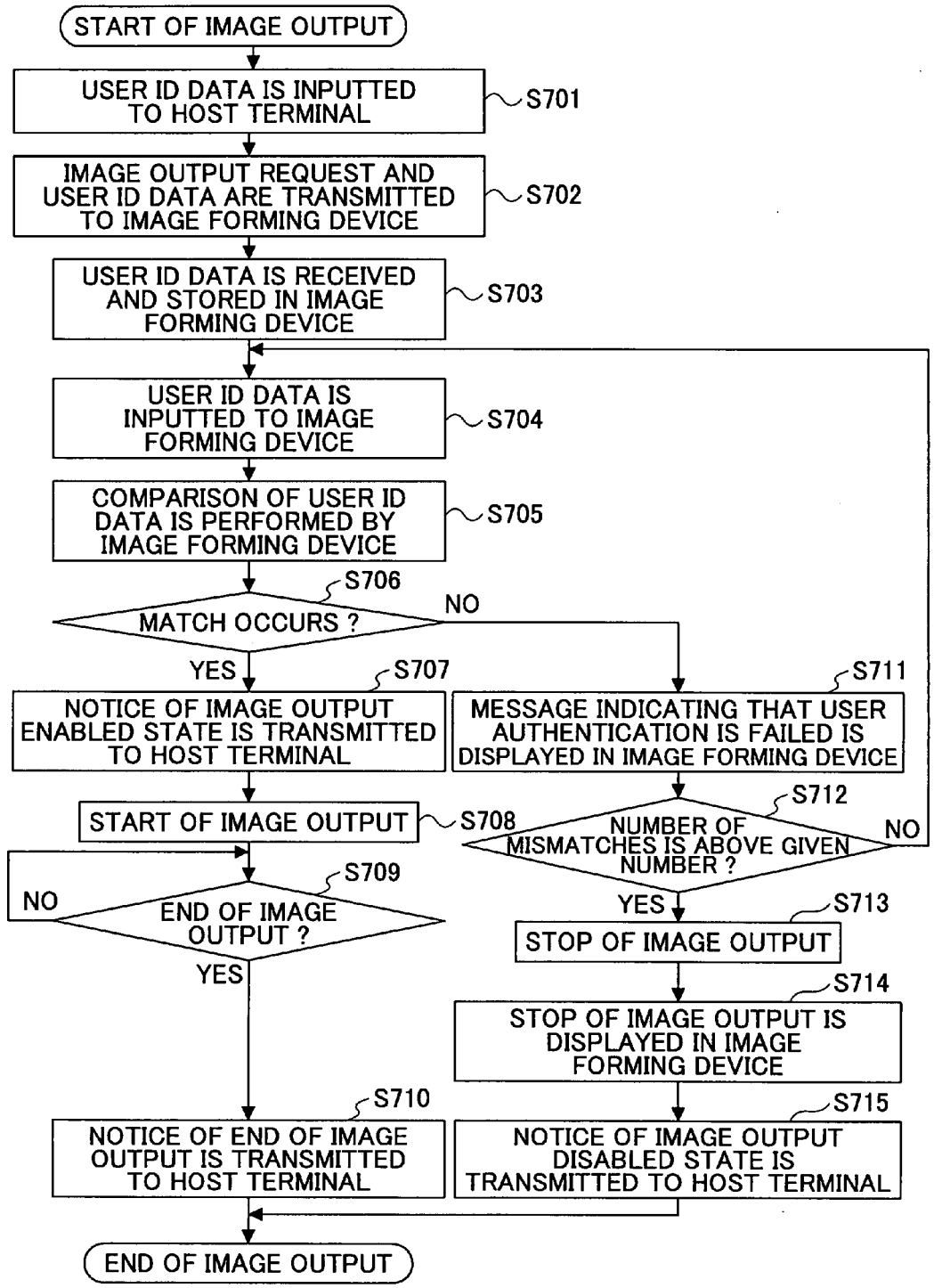
FIG. 7 is a flowchart for explaining the image output procedure performed by the image forming device and the host terminal in an embodiment of the invention.

FIG. 7 is a flowchart for explaining the image output procedure performed by the image forming device and the host terminal in this embodiment.

The procedure of steps S701-S710 in FIG. 7 from the start of the image output to the end of the image output when the matching of the user-identification data occurs is essentially the same as the procedure of steps S501-S510 in FIG. 5, and a description thereof will be omitted.

On the other hand, when the matching of the user-identification data does not occur, the embodiment of FIG. 7 differs from the previous embodiment of FIG. 5 in that this embodiment includes a step in which the user is permitted to reinput the user-identification data to the image forming device 110 by using the identification data input unit 112.

Suppose that the image forming device of this embodiment is provided to use the processing state display unit 113 of the image forming device 110 in order to notify the user of the mismatch of the user-identification data as in the embodiment of FIG. 6.

Specifically, in the procedure of FIG. 7, when it is detected in step S706 that the matching of the user-identification data does not occur, the image forming device 110 in step S711 displays a message indicating that the user authentication is failed, by using the processing state display unit 113.

Next, the image forming device 110 in step S712 detects whether the number of mismatches of the user-identification data is above a predetermined number.

When the number of mismatches of the user-identification data is below the predetermined number, the control is shifted to the step S704, so that the user is permitted to reinput user-identification data to the image forming device 110.

On the other hand, when the number of mismatches of the user-identification data exceeds the predetermined number, the image forming device 110 in step S713 stops performance of the image output job.

Subsequently, in step S714, the image forming device 110 displays a message indicating that performance of the image output job is stopped, by using the processing state display unit 113. Moreover, in step S715, the image forming device 110 transmits an image output disabled state notice, indicating that the image forming device is in an image output disabled state, to the host terminal 100 (which has transmitted the image output request) through the communication unit 114, by using the management information transmitting unit 118.

Since the host terminal 100 is still in an image-data transmission waiting state after the image output request is transmitted to the image forming device 110, the host terminal 100 is above to cancel the image-data transmission waiting state in response to the image output disabled state notice received from the image forming device 110 through the communication unit 102.

As mentioned above, the image forming device of this embodiment is provided so that, even when the matching of the user-identification data does not occur, the user is permitted to perform the repeated input of user-identification data and the repeated image output operation.

The predetermined number in the above-mentioned embodiment is the maximum number of times at which the user can reinput user-identification data to the image forming device 110, and the predetermined number may be set up arbitrarily by the user using the identification data input unit 112 of the image forming device 110 in accordance with the manner of use of the image forming device by the user. Thus, it is possible for the image forming device of this embodiment to perform setting of the security level of the image forming device in accordance with the manner of use of the image forming device by the user.

Alternatively, when the matching of the user-identification data does not occur, a message indicating that the image output job is not performed may be displayed in the host terminal. An image output procedure of the image forming device connected to the host terminal in which a message indicating that performance of an image output job is failed is displayed in response to the image output disabled state notice received from the image forming device 110 will be explained with reference to FIG. 3 and FIG. 8.

FIG. 8 is a flowchart for explaining the image output procedure performed by the image forming device and the host terminal in this embodiment.

The procedure of steps S801-S810 in FIG. 8 from the start of the image output to the end of the image output when the matching of the user-identification data occurs is essentially the same as the procedure of corresponding steps S501-S510 in FIG. 5, and a description thereof will be omitted.

On the other hand, when the matching of the user-identification data does not occur, the embodiment of FIG. 8 differs from the previous embodiment of FIG. 5 in that this embodiment includes a step in which, in response to the image output disabled state notice received from the image forming device 110, the host terminal 100 displays a message indicating that performance of the image output job is failed, by using the processing state display unit 108.

The image forming device of this embodiment notifies the user of the mismatch of user-identification data in the image forming device 110 as in the embodiment of FIG. 6, and presupposes that user-identification data can be reinputted to the image forming device 110 as in the embodiment of FIG. 7.

Specifically, in the procedure of FIG. 8, when it is detected in step S806 that the matching of the user-identification data does not occur, the image forming device 110 in step S811 displays a message indicating that the user authentication is failed, by using the processing state display unit 113.

Next, in step S812, the image forming device 110 detects whether the number of mismatches of the user-identification data is above a predetermined number.

When the number of mismatches of the user-identification data is below the predetermined number, the control is shifted to the step S804, so that the user is permitted to reinput user-identification data to the image forming device 110.

On the other hand, when the number of mismatches of the user-identification data exceeds the predetermined number, the image forming device 110 in step S813 stops performance of the image output job.

Next, the image forming device 110 in step S814 displays a message indicating that performance of the image output job is stopped, by using the processing state display unit 113. Moreover, in step S815, the image forming device 110 transmits an image output disabled state notice, indicating that the image forming device is in an image output disabled state, to the host terminal 100 (which has transmitted the image output request) through the communication unit 114, by using the management information transmitting unit 118.

In response to the image output disabled state notice received from the image forming device 110 through the communication unit 102, the host terminal 100 in step S816 displays a message indicating that performance of the image output job is failed, by using the processing state display unit 108.

Since the host terminal 100 is still in an image-data transmission waiting state after the image output request is transmitted to the image forming device 110, the host terminal 100 is able to cancel the image-data transmission waiting state in response to the image output disabled state notice received from the image forming device 110 through the communication unit 102.

Although this operation may be performed automatically, it may be manually performed by the user who has checked the contents of the display, by using the processing state display unit 108.

When the message indicating that performance of the image output job is failed is displayed, the processing state display unit 108 may display collectively the reason why performance of the image output job is failed (mismatch of the user-identification data). Moreover, such information may be stored in the memory unit 105 of the host terminal 100 as log data.

As mentioned above, it is possible for the host terminal of this embodiment to notify the processing state of the image forming device disposed at a location distant from the host terminal, to the user on the host terminal. Moreover, it is possible for the host terminal of this embodiment to leave the log data concerning the image output operation on the host terminal.

Next, in the environment where the image forming device 110 is connected to a plurality of host terminals, an image output operation performed by the image forming device at the time of receiving of a second image output request from another host terminal during execution of an image output job according to a first image output request from one host terminal will be explained with reference to FIG. 9.

Suppose that the image forming device 110 in FIG. 9 is connected to first and second host terminals 100₁ and 100₂ and the first and second host terminals 100₁ and 100₂ have the same composition as the host terminal 100 shown in FIG. 3.

FIG. 9 is a diagram for explaining the image output procedure performed by the image forming device and the first and second host terminals in such a case.

Upon start of the procedure of FIG. 9, in step S901, the user on the first host terminal 100₁ inputs an image output request for execution of an image output job in the image forming device 110 by using the image output request input unit 103 of the first host terminal 100₁. This image output request is a normal image output request which is not associated by the confidential output function.

In step S902, the first host terminal 100₁ transmits the inputted image output request to the image forming device 110.

When the image forming device 110 is currently in a state which has no active image output job and is ready for performing an image output job, the image forming device 110 in step S903 transmits an image output enabled state notice indicating such a state of the image forming device, to the first host terminal 100₁.

In response to this notice, the first host terminal 100₁ in step S904 starts transmission of image data to the image forming device 110. In step S905, the image data are transmitted to the image forming device 110 through the communication unit 102 of the first host terminal 100₁.

In step S906, the image forming device 110 receives the image data from the first host terminal 100₁ through the communication unit 114, and controls the image output unit 116 to perform in real time the outputting of an image based on the image data received as the objects of image output, until the first host terminal 100₁ finishes the transmission of image data in step S912.

While the image forming device 110 is performing the outputting of the image based on the image data received from the first host terminal 100₁ in step S906, the user in step S907 inputs the user-identification data for identifying the user to the second host terminal 100₂ by using the image output request input unit 103. Then, the user in step S908 inputs an image output request for execution of an image output job in the image forming device 110. This image output request is a request for execution of the image output operation accompanied by the confidential output function.

After this image output request is inputted by the user, the second host terminal 100₂ in step S909 transmits the image output request to the image forming device 110 through the communication unit 102 by using the image output request transmitting unit 104.

In response to this request, the image forming device 110 in step S910 transmits to the second host terminal 100₂ a notice of other-job in-progress state indicating that execution of the image output job of the first host terminal 100₁ is currently in progress.

In response to this notice, the second host terminal 100₂ in step S911 is set in a waiting state, without transmitting image data to the image forming device 110.

After the execution of the image output job of the first host terminal 100₁ is completed in step S913, the image forming device 110 in step S914 transmits through the communication unit 114 to the first host terminal 100₁ a notice of end of the image output operation, which indicates the end of execution of the image output operation, by using the management information transmitting unit 118.

In response to this notice, the first host terminal 100₁ finishes the image output operation in step S915. On the other hand, the image forming device 110 in step S916 transmits to the second host terminal 100₂ an image-data-receiving enabled state notice indicating that the image forming device 110 has no active image output job and is currently changed to a ready state that is able to receive image data as objects of a new image output job.

In response to this notice, the second host terminal 100₂ in step S917 displays a message indicating that the image forming device 110 is changed to the image output enabled state, by using the processing state display unit 108, such as a display monitor.

The second host terminal 100₂ in step S918 transmits the user-identification data previously inputted by the user to the image forming device 110 through the communication unit 102, by using the image output request transmitting unit 104.

In step S919, the image forming device 110 receives the user-identification data from the second host terminal 100₂ through the communication unit 114 and stores the received user-identification data in the memory unit 115.

Subsequently, in step S920, the user checks the display message of the second host terminal 100₂ and inputs the user-identification data for identifying the user to the image forming device 110 by using the identification data input unit 112, in order to request performance of an image output job to the image forming device 110.

After the user-identification data is inputted by the user, the image forming device 110 in step S921 controls the data comparison unit 117 so that the data comparison unit 117 detects whether the inputted user-identification data matches with the user-identification data received from the second host terminal 100₂ and stored in the memory unit 115.

As a result, when matching of those user-identification data occurs, the image forming device 110 in step S922 transmits through the communication unit 114 to the second host terminal 100₂ an image output enabled state notice indicating that the image forming device is in an image output enabled state, by using the management information transmitting unit 118.

In response to the image output enabled state notice, the second host terminal 100₂ in step S923 starts transmission of image data by using the the image-data transmitting unit 107.

In step S924, the image data are transmitted to the image forming device 110 through the communication unit 102.

In step S925, the image forming device 110 receives the image data from the second host terminal 100₂ through the communication unit 114, and the image output unit 116 performs in real time the outputting of an image based on the received image data until the second host terminal 100₂ finishes the transmission of image data in step S926.

After execution of the image output operation is completed in step S927, the image forming device 110 in step S928 transmits to the second host terminal 100₂ through the communication unit 114 an image output end notice indicating the end of execution of the image output operation, by using the management information transmitting unit 118.

Finally, in step S929, the second host terminal 100₂ finishes the image output operation in response to the image output end notice received through the communication unit 102 from the image forming device 110.

In this embodiment, the image output request inputted to the first host terminal 100₁ is a normal image output request which is not accompanied by the confidential output function. Alternatively, the image output request inputted to the first host terminal 100₁ may be an image output request accompanied by the confidential output function.

As mentioned above, when a plurality of image output requests are received from a plurality of host terminals at the same time, it is not necessary for the image forming device of this embodiment to hold image data for performing a subsequent image output job while performing the current image output job. It is no longer necessary for the image forming device of this embodiment to have a mass storage device for storing a plurality of image data as in the conventional image forming device.

Moreover, this invention is not limited to the above-described embodiments. For example, the unit for performing an image output operation in response to an image output request of a specific user provided in the image forming device and the host terminal according to this invention may be realized by using program codes stored on computer-readable recording media, such as a hard disk drive (HDD) or a read only memory (ROM) of the image forming device or the host terminal. Namely, the program codes are read from the computer-readable recording medium and executed by an information processing device, such as a computer, it is possible to realize unit for performing an image output operation in response to an image output request of a specific user in the image forming device and the host terminal according to this invention.

Moreover, the above-mentioned embodiments of the invention are applied to an image output operation of an image forming device. This image output operation may include various image output operations, such as a printing operation to print an image on a recording sheet based on image data, a transmission operation to transmit image data to an external device, or a displaying operation to display an image on a display monitor or projector based on image data. For example, when the image forming device is a multi-function peripheral (MFP) having printer and facsimile functions, an embodiment of the invention may be applied to a data transmission operation to transmit image data to an external device.

The present invention is not limited to the above-described embodiments, and variations and modifications may be made without departing from the scope of the present invention.

Further, the present application is based on and claims the benefit of priority of Japanese patent application No. 2006-056405, filed on Mar. 2, 2006, and Japanese patent application No. 2007-027218, filed on Feb. 6, 2007, the entire contents of which are hereby incorporated by reference.

What is claimed is:

1. An image forming device to which one or a plurality of host terminals are connected, comprising:
    an identification data input unit receiving a first user-identification data which identifies a user of the image forming device and is inputted by the user;
    a data comparison unit detecting whether the first user-identification data received by the identification data input unit matches with a second user-identification data which is received from a host terminal before or after an image output request is received from the host terminal or concurrently with receiving of the image output request;
    a management information transmitting unit transmiting an image output enabled state notice to the host terminal in response to the image output request when it is detected by the data comparison unit that the first user-identification data matches with the second user-identification data; and
    an image output unit receiving image data which is transmitted by the host terminal in response to the image output enabled state notice from the management information transmitting unit, and outputting an image based on the received image data.

2. The image forming device according to claim 1, further comprising a processing state display unit displaying a state of the image forming device, wherein, when it is detected by the data comparison unit that the first user-identification data does not match with the second user-identification data, the processing state display unit displays a message indicating a mismatch of the first user-identification data.

3. The image forming device according to claim 2, wherein, after the message indicating a mismatch of the first user-identification data is displayed by the processing state display unit, the identification data input unit receives a reentry of first user-identification data, and the data comparison unit detects whether the first user-identification data which is the reentry received by the identification data input unit matches with the second user-identification data, and
    wherein, when it is detected by the data comparison unit that the first user-identification data which is the reentry received by the identification data input unit matches with the second user-identification data, the management information transmitting unit transmits an image output enabled state notice to the host terminal in response to the image output request, and when it is detected by the data comparison unit that the first user-identification data which is the reentry received by the identification data input unit does not match with the second user-identification data, the management information transmitting unit transmits an image output disabled state notice to the host terminal in response to the image output request.

4. The image forming device according to claim 3, wherein the identification data input unit is provided to restrict the number of reentrys of the first user-identification data that is received by the identification data input unit.

5. The image forming device according to claim 1, wherein, when a second image output request is received from another host terminal during execution of an image output job by the image output unit in response to a first image output request received from one host terminal, the management information transmitting unit transmits an other-job in-progress state notice to said another host terminals, and, when the execution of the image output job in response to the first image output request is finished by the image output unit, the management information transmitting unit transmits an image-data-receiving enabled state notice to said another host terminal.

6. A host terminal which is connected to an image forming device and generates image data being transmitted to the image forming device, the image forming device comprising:
an identification data input unit receiving a first user-identification data which identifies a user of the image forming device and is inputted by the user;
a data comparison unit detecting whether the first user-identification data matches with a user-identification data which is received before or after an image output request is received or concurrently with receipt of the image output request;
a management information transmitting unit transmitting an image output enabled state notice to the host terminal in response to the image output request when it is detected by the data comparison unit that the first user-identification data matches with the received user-identification data; and
an image output unit receiving image data which is transmitted by the host terminal in response to the image output enabled state notice from the management information transmitting unit, and outputting an image based on the received image data,
the host terminal comprising:
an image output request input unit receiving a second user-identification data which identifies a user who transmits the image output request of the image data and is inputted by the user;
an image output request transmitting unit transmitting the second user-identification data received by the image output request input unit, to the image forming device before or after the image output request is transmitted to the image forming device or concurrently with the transmission of the image output request; and
an image-data transmitting unit transmitting the image data to the image forming device when the image output enabled state notice is received from the image forming device.

7. The host terminal according to claim 6, further comprising a processing state display unit displaying a job processing state of the image forming device, wherein, when at least one of an image output disabled state notice, an other-job in-progress state notice, and an image-data-receiving enabled state notice is received from the image forming device, the processing state display unit displays the contents of the received notice.

8. An image output system including an image forming device and one or a plurality of host terminals connected to the image forming device and generating image data being transmitted to the image forming device,
the image forming device comprising:
an identification data input unit receiving a first user-identification data which identifies a user of the image forming device and is inputted by the user;
a data comparison unit detecting whether the first user-identification data matches with a user-identification data which is received before or after an image output request is received or concurrently with receipt of the image output request;
a management information transmitting unit transmitting an image output enabled state notice to a host terminal in response to the image output request when it is detected by the data comparison unit that the first user-identification data matches with the received user-identification data; and
an image output unit receiving image data which is transmitted by the host terminal in response to the image output enabled state notice from the management information transmitting unit, and outputting an image based on the received image data,
each host terminal comprising:
an image output request input unit receiving a second user-identification data which identifies a user who transmits the image output request of the image data and is inputted by the user;
an image output request transmitting unit transmitting the second user-identification data received by the image output request input unit, to the image forming device before or after the image output request is transmitted to the image forming device or concurrently with the transmission of the image output request; and
an image-data transmitting unit transmitting the image data to the image forming device when the image output enabled state notice is received from the image forming device.

9. A computer-readable recording medium having program code stored thereon which, when executed by a computer, causes the computer to perform an image output method in an image forming device to which one or a plurality of host terminals are connected, the image output method comprising:
receiving a first user-identification data which identifies a user of the image forming device and is inputted by the user;
detecting whether the received first user-identification data matches with a second user-identification data which is received from a host terminal before or after an image output request is received from the host terminal or concurrently with receipt of the image output request;
transmitting an image output enabled state notice to the host terminal in response to the image output request when it is detected that the first user-identification data matches with the second user-identification data; and
receiving image data which is transmitted by the host terminal in response to the image output enabled state notice, and outputting an image based on the received image data.

10. An image output method for use in an image forming device to which one or a plurality of host terminals are connected, the image output method comprising:
receiving a first user-identification data which identifies a user of the image forming device and is inputted by the user;
detecting whether the received first user-identification data matches with a second user-identification data which is received from a host terminal before or after an image output request is received from the host terminal or concurrently with receipt of the image output request;
transmitting an image output enabled state notice to the host terminal in response to the image output request when it is detected that the first user-identification data matches with the second user-identification data; and
receiving image data which is transmitted by the host terminal in response to the image output enabled state notice, and outputting an image based on the received image data.

* * * * *